2 Sheets—Sheet 1.
R. P. PICTET.
PROCESS OF PRODUCING ARTIFICIAL COLD BY MEANS OF ANHYDROUS SULPHUROUS OXIDE.
No. 187,413. Patented Feb. 13, 1877.
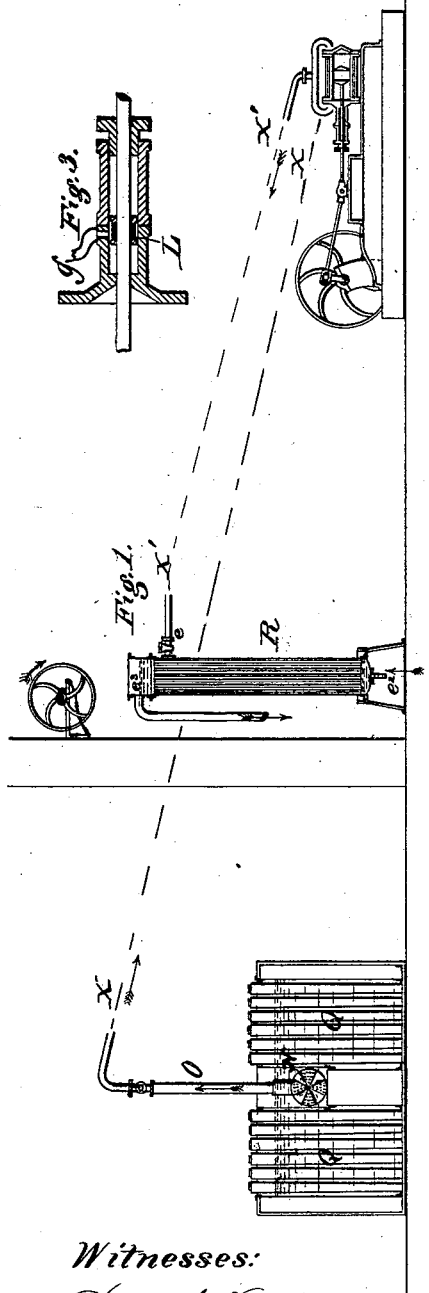
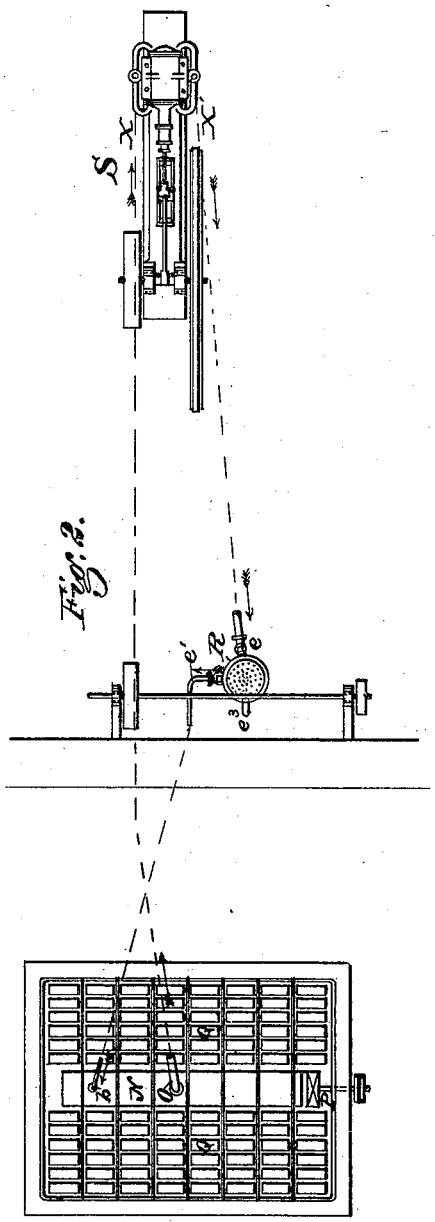
Witnesses:
Inventor:
R. P. Pictet
by Dodge & Son,
Attys 2 Sheets—Sheet 2.
R. P. PICTET.
PROCESS OF PRODUCING ARTIFICIAL COLD BY MEANS OF ANHYDROUS SULPHUROUS OXIDE.
No. 187,413. Patented Feb. 13, 1877.
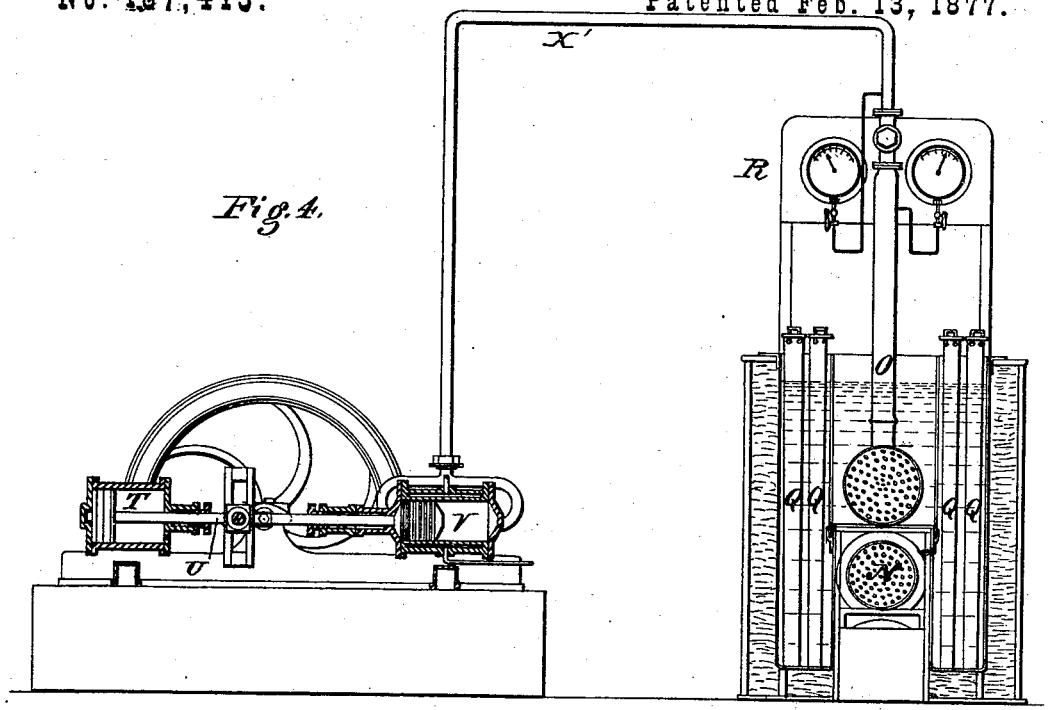
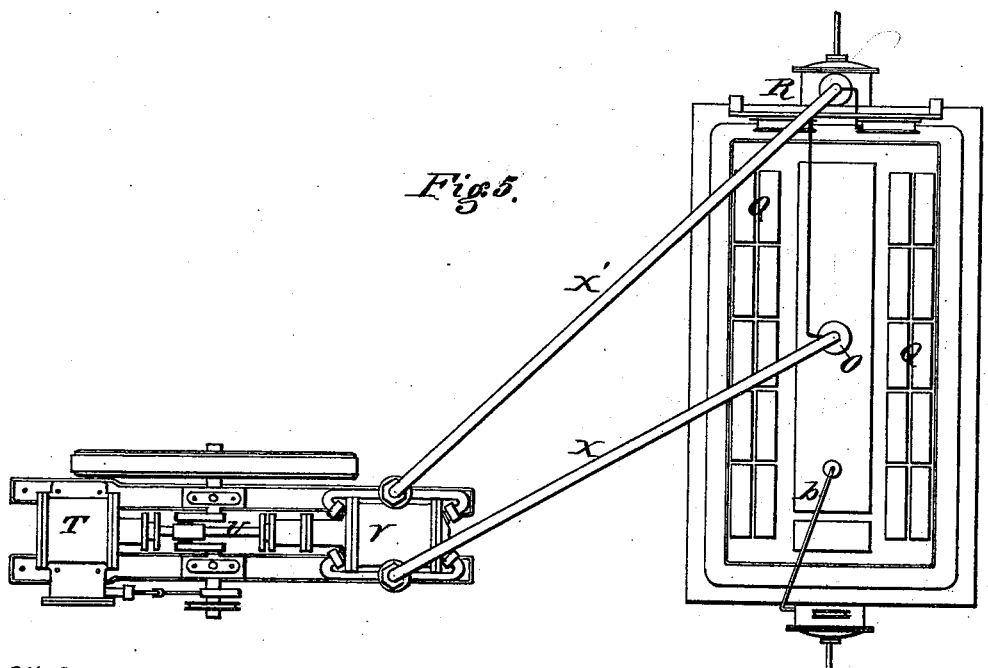
Witnesses:
Inventor:
R. P. Pictet
by Dodge & Son
Atty.
N. PETERS, PHOTO-LITHOGRAPHER, WASHINGTON, D. C.

UNITED STATES PATENT OFFICE.

RAOUL PIERRE PICTET, OF GENEVA, SWITZERLAND.

IMPROVEMENT IN PROCESSES OF PRODUCING ARTIFICIAL COLD BY MEANS OF ANHYDROUS SULPHUROUS OXIDE.

Specification forming part of Letters Patent No. 187,413, dated February 13, 1877; application filed June 28, 1876.

*To all whom it may concern:*

Be it known that I, R. P. PICTET, of Geneva, Switzerland, have invented Improvements in Process of Producing Artificial Cold by means of Anhydrous Sulphurous Oxide, of which the following is a specification:

This invention consists in a process of producing artificial cold for the manufacture of ice, and similar purposes, by means of anhydrous sulphurous oxide, as hereinafter more fully explained.

Various plans or methods of manufacturing ice have heretofore been invented and patented, but all are attended with difficulties of more or less importance, which this invention is intended to obviate.

The three principal plans now in use to a greater or less extent, are, first, that in which a saturated solution of ammonia is used, and also in the use of liquefied ammonia. This has to be heated to a temperature of 280° to 302° Fahreheit, with a pressure in the apparatus of from fifteen to eighteen atmospheres, thus requiring enormous strength in the apparatus, and rendering it dangerous on account of the liability of bursting, besides being very difficult to keep the joints tight and keeping the ammonia from escaping. In addition to this, the fire under the boiler causes deposits to be formed, requiring constant care to prevent explosions.

Second, is the plan in which sulphuric ether is used. This is found to be objectionable, for the reason that ether is a liquid of small volatility and giving but weak tensions, it being at 23° to 27° Fahrenheit equal to three and one-eight to six and one-fourth inches of mercury only. The pneumatic apparatus must, therefore, be of a large dimension, in order to draw up a small amount of ether, and produce a limited amount of cold. And if air be admitted through the joints of the apparatus, the first half of which works an almost complete vacuum, the vaporization of the ether will entirely cease. Moreover, the ether is not perfectly constant in its chemical characteristics, and, under frequent volitilizations and condensations, it becomes acidified, thus rendering it necessary to frequently change the active liquid, which is troublesome and expensive. Besides, the action of the ether upon the greases used for lubricating the piston of the cylinder forms a mixture which is carried into all parts of the apparatus, and interferes with its successful operation, more or less.

Third, is the plan of using compressed air. This, in order to work successfully, requires large cylinders and close-fitting pistons, with little friction, and a perfectly regulated introduction into the expansion-cylinder and orifices, with valves without a flaw—conditions which are exceedingly difficult to realize or maintain. A large piston operating under a temperature of 140° Fahrenheit of cold is productive of much friction. In addition to this a coating of frost or ice in the expansion-cylinder is also a cause of accidents and trouble in working it.

It is known that sulphurous oxide as a refrigerating agent possesses many and great advantages over any of the other volatile substances that have been employed as such. It liquefies at 10° centigrade, and then has a tension equal to the pressure of the atmosphere; and at 30° centigrade its tension does not equal four atmospheres, so that an excessive and dangerous pressure in the apparatus employed is avoided by its use, and much less power is of course required to reduce it from a state of vapor to a liquid form in ice-making and other forms of refrigeration than with sulphuric ether, and the other substances above named.

Notwithstanding these advantages, the various attempts that have been made to practically employ it as a refrigerating agent in the manufacture of ice, refrigerating air, &c., by apparatus adapted to the continuous alternate evaporation and condensation of it, have resulted only in failure, it having been found to attack and destroy or injure the apparatus in which it has been attempted to be employed; also, to form ice within the tubes and the vacuum and condensing pump necessarily employed, thereby clogging them and interfering with their operation. The reason of such conduct of this agent has been that it has not been so employed in a pure and entirely anhydrous state, even though the substance used may have been designated by those who have used it by its chemical name.

I have found, by a series of experiments, that pure anhydrous sulphurous oxide may be successfully employed in an apparatus suitable for effecting therein its continuous alternate vaporization and condensation, so as to successfully manufacture ice and refrigerate air on a practical scale, without injury to the apparatus or the formation of ice within the vacuum or condensing pump. But the presence in it of even a small percentage of water or sulphuric acid will render it unfit for use, by causing the destruction or disabling of the apparatus.

Having been the first to ascertain the adaptation of really anhydrous sulphurous oxide for the use above described, that the material could be thus successfully used, I believe I am the first ever to have employed it as the refrigerating agent in an apparatus suitable for its continuous alternate vaporization and condensation in the process of refrigeration. Thus it is obvious that this substance, sulphurous oxide, to be susceptible of being successfully used for refrigerating purposes, in the manner herein described, must be rendered anhydrous. This may be done in any of the modes known to chemistry.

The following description will suffice to enable those skilled in the art to fully understand and practice my invention:

The present invention having reference to the process rather than the apparatus, the accompanying drawings are designed merely to illustrate the process, and will be described only so far as necessary for that purpose, it being my intention to make a separate application hereafter for a patent upon the novel features of my apparatus.

In the accompanying drawings, Figures 1, 2, and 3 represent the apparatus in which I propose to use the anhydrous sulphurous oxide for making ice, and Figs. 4 and 5 represent a modification of the same, more especially designed for use on shipboard.

The principle upon which cold is produced in this case is by causing the liquefied gas to enter a refrigerator, where its volatilization absorbs the heat from the brine in which the refrigerator is immersed in a tank, thereby reducing the temperature of the brine to a degree sufficient to congeal fresh water held in suitable vessels and immersed in the brine.

In order, however, to produce the best results, I use a refrigerator constructed on the plan of a tubular boiler, with a large number of tubes, through which, as well as around the body of the vessel, the brine is caused to circulate so as to bring it in contact with as large a surface as possible, in order that the gas may absorb the heat as rapidly as possible; and, as a further aid to success, it is important that the brine should be caused to circulate rapidly through the tubes of the refrigerator, and also among and around the vessels containing the liquid to be frozen or the articles to be cooled, and these conditions I have provided for in my improved apparatus, to which allusion has heretofore been made.

By means of a pump the gas is drawn off from the refrigerator continuously as it is formed by the volatilization of the liquid, is recondensed, and again returned to the refrigerator, and thus the process is rendered continuous, the same material being used over and over repeatedly, the stability of character of the anhydrous sulphurous oxide rendering it especially capable of being so used.

It is obvious that it may in like manner be used for cooling air or other substances, for refrigerating or cooling chambers or cellars, store-rooms of any kind, and also for cooling the air in dwellings or other buildings.

It is obvious that the anhydrous sulphurous oxide may either be immediately used when produced, or it may be condensed or liquefied, and stored in suitable vessels, and be conducted to the refrigerator as it may be required.

The advantages of the use of this material for these purposes are, first, that the pressure never exceeds four atmospheres; second, there is never any entry of air to fear, since the pressures, up to 14° Fahrenheit, are always above that of the atmospheres; third, all greasing of the machine, with which the material comes in contact, is dispensed with, the material itself serving as a lubricant, and, if grease be used, it is not affected by the anhydrous material; fourth, the volatile liquid employed is perfectly stable, undecomposable, and without action on metals; fifth, the volatile liquid is produced at a very low price, and it is accompanied by no danger of explosion or fire; sixth, by its use in the manner described, ice can be produced at a very low rate.

Having thus described my invention, what I claim, and desire to secure by Letters Patent, is—

The herein-described process of producing artificial cold, which process consists in the utilization of sulphurous oxide that has been rendered anhydrous and condensed, by conducting the same into a refrigerator, and allowing it to volatilize therein, substantially as described.

In testimony whereof I have signed my name to this specification before two subscribing witnesses.

RAOUL PIERRE PICTET.

Witnesses:
LOUIS BOGET,
ARTHUR BOGET.